(12) United States Patent
Ezzo

(10) Patent No.: US 10,115,145 B1
(45) Date of Patent: *Oct. 30, 2018

(54) METHOD FOR GENERATING SALES OF A CONVERSATIONAL VOICE RESPONSE SYSTEM

(71) Applicant: Open Invention Network, LLC, Durham, NC (US)

(72) Inventor: Nicholas Anthony Ezzo, San Jose, CA (US)

(73) Assignee: Open Invention Network, LLC, Durham, NC (US)

( * ) Notice: Subject to any disclaimer, the term of this patent is extended or adjusted under 35 U.S.C. 154(b) by 492 days.

This patent is subject to a terminal disclaimer.

(21) Appl. No.: 13/934,718

(22) Filed: Jul. 3, 2013

Related U.S. Application Data

(63) Continuation of application No. 12/972,668, filed on Dec. 20, 2010, now Pat. No. 8,504,439, which is a continuation of application No. 11/468,704, filed on Aug. 30, 2006, now Pat. No. 8,060,415.

(51) Int. Cl.
| | |
|---|---|
| G06Q 30/00 | (2012.01) |
| G06Q 30/02 | (2012.01) |
| G06Q 30/06 | (2012.01) |
| H04M 3/42 | (2006.01) |

(52) U.S. Cl.
CPC ..... *G06Q 30/0629* (2013.01); *G06Q 30/0251* (2013.01); *G06Q 30/0271* (2013.01); *H04M 3/42221* (2013.01)

(58) Field of Classification Search
CPC .......... G06Q 30/02–30/0284; G06Q 30/06–30/0645; G06Q 30/08; G06Q 50/01

USPC ........................... 705/14.49, 26–27.2
See application file for complete search history.

(56) References Cited

U.S. PATENT DOCUMENTS

| 5,588,044 A * | 12/1996 | Lofgren et al. ............ 379/67.1 |
| 6,724,887 B1 * | 4/2004 | Eilbacher et al. ....... 379/265.03 |
| 7,117,158 B2 * | 10/2006 | Weldon et al. .............. 704/270 |
| 7,203,305 B1 * | 4/2007 | Hajj et al. .............. 379/265.06 |

OTHER PUBLICATIONS

Zager, Masha; "Speech Recognition Goes Mainstream," Oct. 2005, Call Center Magazine, v18 n10, pp. 20-24, 26, 28-30.*

* cited by examiner

*Primary Examiner* — Adam L Levine

(57) ABSTRACT

In one aspect, the invention provides a method for generating a sales lead for the sale of a CVR system. The method comprises initiating a call in which a human calls an organization and interacts with an interactive voice response (IVR) system that defines an interface to a database for an organization in order to obtain information from the database; generating a first audio file comprising a recording of the interaction; generating a second audio file comprising a recording of an interaction of the caller with a CVR system in order to obtain the same information from the database; presenting the first and second audio files to a decision maker in the organization who has some influence on a decision to purchase the CVR system; tracking when the decision maker accesses the audio files; and initiating contact with the decision maker once access of the audio files is established.

18 Claims, 1 Drawing Sheet

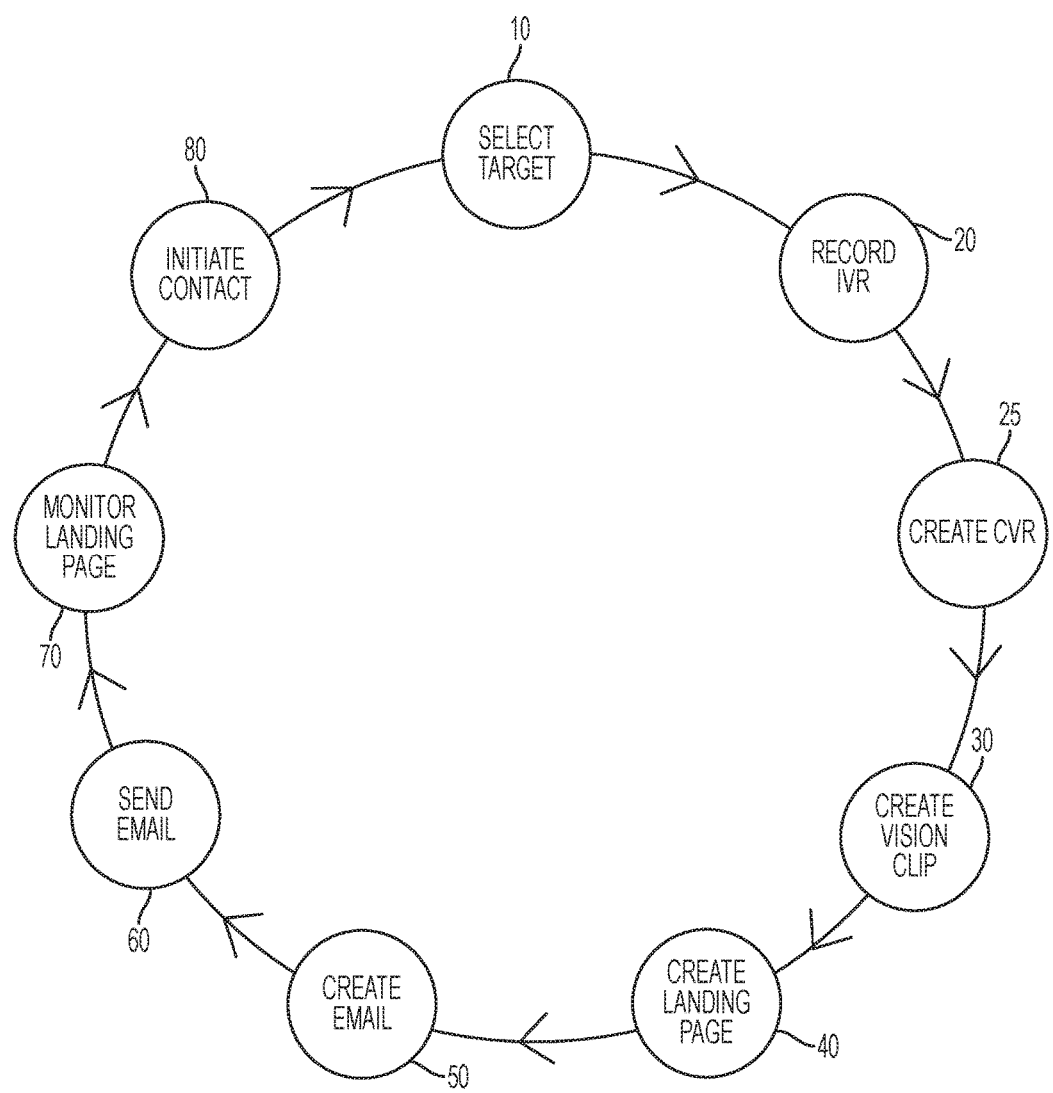

METHOD FOR GENERATING SALES OF A CONVERSATIONAL VOICE RESPONSE SYSTEM

CROSS-REFERENCE TO RELATED APPLICATIONS

This application is a continuation of U.S. patent application Ser. No. 12/972,668, filed on Dec. 20, 2010, entitled METHOD FOR GENERATING SALES OF A CONVERSATIONAL VOICE RESPONSE SYSTEM, which is a continuation of U.S. patent application Ser. No. 11/468,704, filed on Aug. 30, 2006, entitled METHOD FOR GENERATING SALES OF A CONVERSATIONAL VOICE RESPONSE SYSTEM, now issued U.S. Pat. No. 8,060,415, issued Nov. 15, 2011, each of which is incorporated by reference herein in their entirety.

FIELD OF THE INVENTION

Embodiments of the invention relate to techniques for generating sales leads in the field of call routing systems.

BACKGROUND

Interactive Voice Response (IVR), is a telephony technology in which someone uses a touch-tone telephone to interact with a database to acquire information from or enter data into the database. IVR technology does not require human interaction over the telephone as the user's interaction with the database is predetermined by what the IVR system will allow the user access to. For example, banks and credit card companies use IVR systems so that their customers can receive up-to-date account information instantly and easily without having to speak directly to a person. IVR technology is also used to gather information, as in the case of telephone surveys in which the user is prompted to answer questions by pushing the numbers on a touch-tone telephone.

A conversational voice response (CVR) system is a technology whereby a caller can navigate an informational database in order to retrieve pertinent information by having a conversation or dialogue with the system. The system plays audio prompts to get information from caller and uses the caller's utterances or responses to extract pertinent portions of the database for playback to the user. An example of a CVR system is described in U.S. patent application Ser. No. 10/319,144, which is hereby incorporated by reference. CVR technology is preferable to IVR technology in that a caller does not have to listen to long prompts and the caller can speak responses as opposed to having to key the responses via a touch tone telephone.

A challenge of making an organization switch from IVR technology to CVR technology is to locate qualified prospects, to personalize marketing and sales information to match those prospects, and to deliver the marketing and sales information in a timely and compelling manner.

SUMMARY OF THE INVENTION

Embodiments of the present invention relate to a technique for generating a sales lead where the product to be sold is a conversational voice response (CVR) system such as is described in co-pending U.S. patent application Ser. No. 10/319,144 The technique may include generating a first audio file comprising a recording of an IVR interaction between a human caller and the existing IVR system of the organization. The IVR interaction represents a particular instance of navigation of a database to which the IVR system is designed to be an interface. For example, the IVR interaction may involve the human caller making a request for information such as balance due, payment due date, or status information pertaining to an insurance claim. A second audio file is also generated. This second audio file comprises a recording of the human caller navigating the database for the same information as with the IVR interaction, except that the interface to the database for the second interaction is a CVR system. Both audio files are presented to a decision maker within the organization.

In one embodiment, presenting the audio files may include embedding links to the audio files in webpage code that can be rendered on a browser. The links may be used to download and play the audio files.

In order to increase a likelihood of a sale, in another embodiment, the invention includes a tracking technique to track when the webpage is viewed by the decision maker so that contact may be made with the decision maker shortly thereafter.

Other aspects of the invention will be apparent from the detailed description below.

BRIEF DESCRIPTION OF THE DRAWINGS

FIG. 1 shows a flowchart of a process to generate sales leads in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention disclose a method of generating a sales lead for the sale of a CVR system. The steps in the method can be seen in the flowchart of FIG. 1.

Referring to FIG. 1, at 10 a target is selected based on an analysis of an existing IVR system for the organization. For example an organization with a "bad" IVR system may be selected as a target, in one embodiment. An IVR system is bad if it has multiple layers, multiple options, or too many voices. In another embodiment, an organization is selected if it meets a particular profile measured in terms of call volume (typically thousands of calls), number of live agents (say more than 50), or annual revenue (say greater that $100 M). Another factor in the selection of the organization is the brand associated with the organization. Strong brands translate into a good vision clip (see below) or comparative web page. Organizations may also be selected based on their focus on customer loyalty and retention policies. This can be evidenced by the organization having a VP or C-level person responsible for customer service/support.

At 20, a process for recording an IVR interaction is implemented. For this process a human caller calls the selected organization and interacts with the IVR to navigate through a database to obtain different pieces of information pursuant to different transactions. Each transaction may be a bottom-line (monetary) transaction, for example a payment transaction or an order status transaction. The calls may be made to a vanity number for the organization. The idea behind making multiple calls is to find a sample transaction for which it is cumbersome or difficult to get information for. In other words, it takes too long to get to the information. In one embodiment, an ease indication may be used to quantify the relative ease of navigating or getting to desired information. To calculate the ease indication, metrics such length of time elapsed before the desired information is retrieved, the number of menus that must be navigated, the number of key presses etc. to the desired information. Once the sample transaction is identified, the process 20 includes recording the caller's interaction with the IVR system in order to navigate the database in order to retrieve the information for the sample transaction. A first audio file is generated corresponding to the recording. At 25, a CVR is recorded.

Next in process 30, a vision clip is generated for the sample transaction. A vision clip is an illustrative conversation that the caller has with a CVR system in order to navigate the database to obtain the information associated with the sample conversation in the first audio file. The point of the vision clip is to demonstrate the ease with which the information associated with the sample conversation may be retrieved using the CVR system as opposed to using the IVR system. The illustrative conversation is recorded and saved in a second audio file. The illustrative conversation may be carefully scripted to demonstrate the efficacy of conversational call routing. In some cases a prompt for a cross-sell or for an up-sell may be included in the illustrative conversation. For example in the case of life insurance the cross sell prompt may prompt for the sale of home owner's insurance, in the case of an electronic product sale, the up-sell prompt may prompt for the sale of rechargeable batteries, or in the case of a transaction pertaining to an address change, the up-sell prompt may prompt for an upgraded subscription.

In one embodiment, the illustrative conversation may include branding information such as a tagline for the organization, and earcons so as to make it as realistic as possible. In one embodiment, the illustrative conversation is scripted to mirror the intent of the IVR. However, the conversation is streamlined as much as possible, for example by eliminating confirmation prompts, and by minimizing unnecessary steps such as legal disclaimers and language prompts. Thus, the illustrative conversation is made as minimal as possible to allow rapid information retrieval from the database.

Referring again to FIG. 1 of the drawings, in process 40 a landing page is created using the first and second audio files. The landing page is a webpage that includes embedded links to the first and second audio files. The landing page includes the necessary browser executable code to enable a browser to render the landing page. In one embodiment, the website landing page may include detailed metrics about number of menu items, number of menu layers, time to begin, time to complete, etc. The landing page is hosted on a server and is assigned a uniform resource locator (URL) that includes at least a part of a name for the organization.

In process 50 an email is created for the purpose of sending the URL for the landing page to the decision maker. An example of such and email is shown below"

Dear Mr. Plotts,

A colleague of mine recently called Allstate at 800-ALLSTATE to make a payment. It took him over two minutes to navigate through an extensive set of menus and touch-tone decision trees to reach the automated "make a payment" selection and complete the transaction.

As CEO of a voice self-service company, I hear about a number of confusing and sometimes frustrating customer service applications. I found the Allstate example intriguing, so I asked my team to record the call and then asked them to construct the same scenario using TuVox voice self-service. I think you'll find the difference remarkable. Please take a minute to hear this comparison for yourself at http://www.tuvox.com/prc/prc_allstate_2557/

As you know, many of the common points of frustration in this example (multiple menu options, number of touch tone entries) are not unique to Allstate. They are due to the inherent limitations of traditional touch-tone applications, particularly when there is a broad range of customer choices that have to be accessed using a touch-tone menu.

As you heard in the attached example, with the TuVox natural language ("How can I help you?") user interface, the caller simply says why they're calling and gets immediately routed to the right area to complete their transaction. In addition, TuVox automates the majority of routine agent tasks by automatically converting and delivering existing enterprise data (customer information, web self-service content, knowledge bases, etc.) through sophisticated voice self-service applications, using a conversational interface like the example you just heard. This combination provides the most tangible value by reducing support costs while providing a better caller experience.

If you found this compelling, I think you'll be surprised at how quickly and affordably Allstate could have this in place for its customers. TuVox has delivered applications like these in as little as sixty days, enabling companies like MCI, TiVo and the United States Postal Service to improve customer satisfaction and brand loyalty while reducing customer support costs. I would like to speak with you about how we could do the same for Allstate. I will have my assistant follow up with you to arrange a mutually agreeable time to talk.

Best regards,

Larry

Larry S. Miller

President and CEO 408-625-1700 http://www.tuvox.com

When generating the email, a subject line is selected to reflect the content of the email such as "XYZ Customer Service Issue" and to grab the attention of the decision maker. The body of the email describes the customer service issue succinctly and specifically. The 800 number or the vanity number of the organization that was called is referenced in the email. Information pertaining to the call such as the length of time spent navigating to the information, the duration of time spent waiting for service in a queue, etc is also included in the email body. The email body also includes an embedded link to the landing page.

In process 60, the email is sent to the decision maker. The email properties are set to request a delivery receipt or confirmation. The priority of the mail is set to high, and a digital signature is added for credibility.

In process 70, the landing page URL is monitored to determine whether it has been visited. A monitoring service such as that provided by Visistat Inc of Saratoga, Calif. may be used to provide real time monitoring of the landing page.

In process 80, once it is determined that the landing page has been visited, contact is made with the decision maker. The contact may include a telephone call to the decision maker or a gatekeeper such as the decision maker's administrative assistant. The call is to discuss the possible purchase of the CVR system by the organization. Typically, a follow up meeting results from the telephone call.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:

1. A method, comprising:
   generating a first audio file comprising a recording of an interaction of a caller and an interactive voice response (IVR) system for a first transaction;
   generating a second audio file comprising a recording of an interaction of a caller and a conversational voice response system (CVR) system for a second transaction, the second transaction retrieving equivalent information as the first transaction from a database by performing at least one of requiring fewer selection prompt operations and utilizing less time than the first transaction;
   generating an ease indication for each piece of information that is representative of an ease with which the piece of information can be obtained;
   creating a link to the first audio file and the second audio file;
   forwarding the link with the first audio file and the second audio file to a computer associated with a designated contact;
   monitoring a page location to identify when the audio files are accessed from the link; and
   transmitting a communication to the designated contact when access of the link is established.

2. The method of claim 1, further comprising at least one of: navigating the database with the interactive voice response (IVR) system to obtain the pieces of information; and selecting that information that has the ease indication to navigate to as the information that the caller navigates to for the generating the first audio file, wherein the IVR system defines an interface to the database for the organization in order to obtain information from the database.

3. The method of claim 1, wherein presenting the first and second audio file to the user comprises developing web page code that can be rendered as a web page on a browser, the web page code having the link to the first and the second audio files embedded; and sending the link to the web page code to the computer via email.

4. The method of claim 3, wherein the link to the webpage code includes a uniform resource locator (URL) that has a part of a name for the organization therein.

5. The method of claim 3, wherein the email includes text explaining how the first and second audio files were generated.

6. The method of claim 5, further comprising sending the email to the computer and to a computer of an administrative assistant.

7. The method of claim 6, wherein monitoring comprises requesting a delivery confirmation from an email system that delivers the message.

8. The method of claim 7, wherein monitoring comprises monitoring when the URL for the webpage code is accessed.

9. The method of claim 1, wherein transmitting communication comprises telephoning the designated contact.

10. The method of claim 1, wherein the designated contact is the chief executive officer of the organization.

11. The method of claim 1, wherein the communication is sent on a weekend.

12. The method of claim 1, wherein the communications includes a digital certificate.

13. The method of claim 1, wherein the second transaction of the caller comprises a cross-sell prompt and response.

14. The method of claim 1, wherein the second transaction of the caller comprises as up-sale prompt and response.

15. A non-transitory computer readable storage medium comprising instructions that are executable by at least one computer for:
   generating a first audio file comprising a recording of an interaction of a caller and an interactive voice response (IVR) system for a first transaction;
   generating a second audio file comprising a recording of an interaction of a caller and a conversational voice response system (CVR) system for a second transaction, the second transaction retrieving equivalent information as the first transaction from a database by performing at least one of requiring fewer selection prompt operations and utilizing less time than the first transaction;
   generating an ease indication for pieces of information that are representative of an ease with which the pieces of information can be obtained;
   creating a link to the first audio file and the second audio file;
   forwarding the link with the first audio file and the second audio file to a computer associated with a designated account; and
   transmitting a communication to the designated contact when access of the link is established.

16. The non-transitory computer readable storage medium of claim 15, further comprising instructions that are executable by the at least one computer for navigating the database with the IVR system to obtain distinct pieces of information.

17. The non-transitory computer readable storage medium of claim 16, further comprising instructions that are executable by the at least one computer for selecting information that has the ease indication to navigate to which the caller navigates to for purposes of the generating the first audio file, and wherein the IVR system defines an interface to the database in order to obtain information from the database.

18. The non-transitory computer readable storage medium of claim 15, wherein the caller with the IVR system and the caller with the CVR system are at least one of: a same caller and a different caller.

* * * * *